Figure 3:
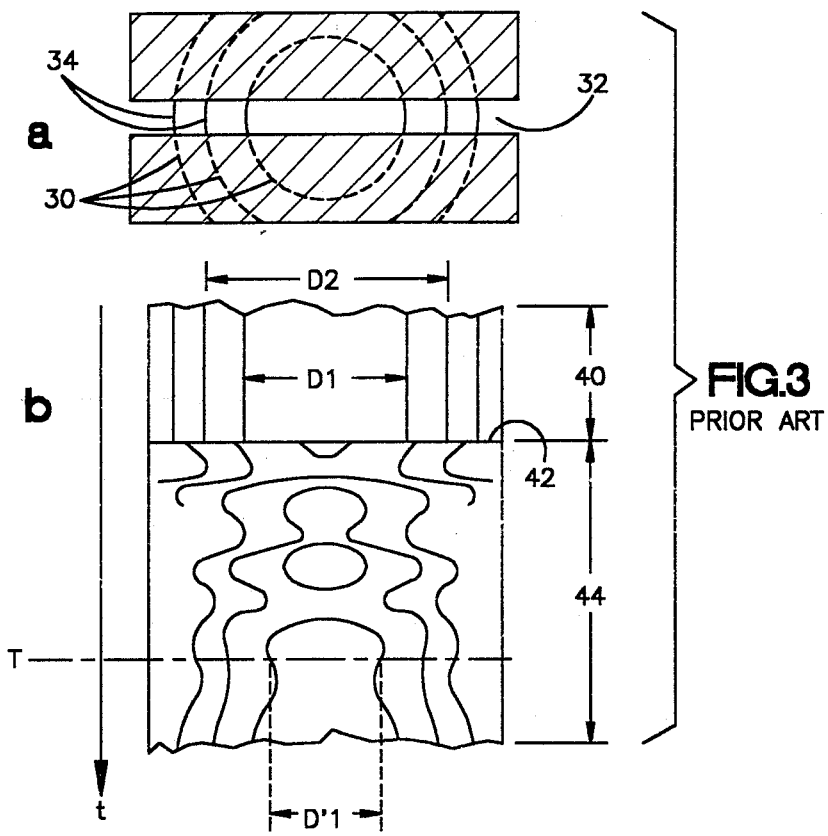

United States Patent [19]

Gidon et al.

[11] Patent Number: 4,915,499
[45] Date of Patent: Apr. 10, 1990

[54] OPTICAL DEVICE USING A MATCHED INTERFEROMETRIC ANALYZER AND FILTER

[75] Inventors: Serge Gidon, Voiron; Gilles Behar, Sceaux, both of France

[73] Assignee: Comissariat a l'Energie Atomique, Paris, France

[21] Appl. No.: 143,357

[22] Filed: Jan. 12, 1988

[30] Foreign Application Priority Data

Jan. 21, 1987 [FR] France .................. 87 00659

[51] Int. Cl.$^4$ .......................... G01P 3/36; G01C 3/08
[52] U.S. Cl. ...................................... 356/28.5; 356/4; 356/4.5; 356/5
[58] Field of Search .............. 356/4, 5, 28.5, 4.5

[56] References Cited

U.S. PATENT DOCUMENTS

| | | | |
|---|---|---|---|
| 3,788,743 | 1/1974 | George | 356/28.5 |
| 3,802,775 | 4/1974 | Hughes | 356/4 |
| 3,940,608 | 2/1976 | Kissinger | 356/4 |
| 3,942,890 | 3/1976 | Malone | 356/4 |
| 4,476,875 | 10/1984 | Nilsson et al. | |
| 4,766,323 | 8/1988 | Franklin et al. | 3256/4 |

OTHER PUBLICATIONS

Applied Optics, May 25, 1986, No. 9.

Primary Examiner—Stephen C. Buczinski
Attorney, Agent, or Firm—Pearne, Gordon, McCoy & Granger

[57] ABSTRACT

The device according to the invention comprises a wide spectrum lighting source (60), a first interferometer (FP1) serving as a filter, a second interferometer (FP2) with the same characteristics as the first and a photodetector (66). The identity of the characteristics of the two interferometers makes it possible to work with higher lighting power levels than in the prior art. The two interferometers are advantageously constituted by a single apparatus used twice.

Application to the measurement of the position, displacement or speed of a surface, particularly in detonics.

7 Claims, 5 Drawing Sheets

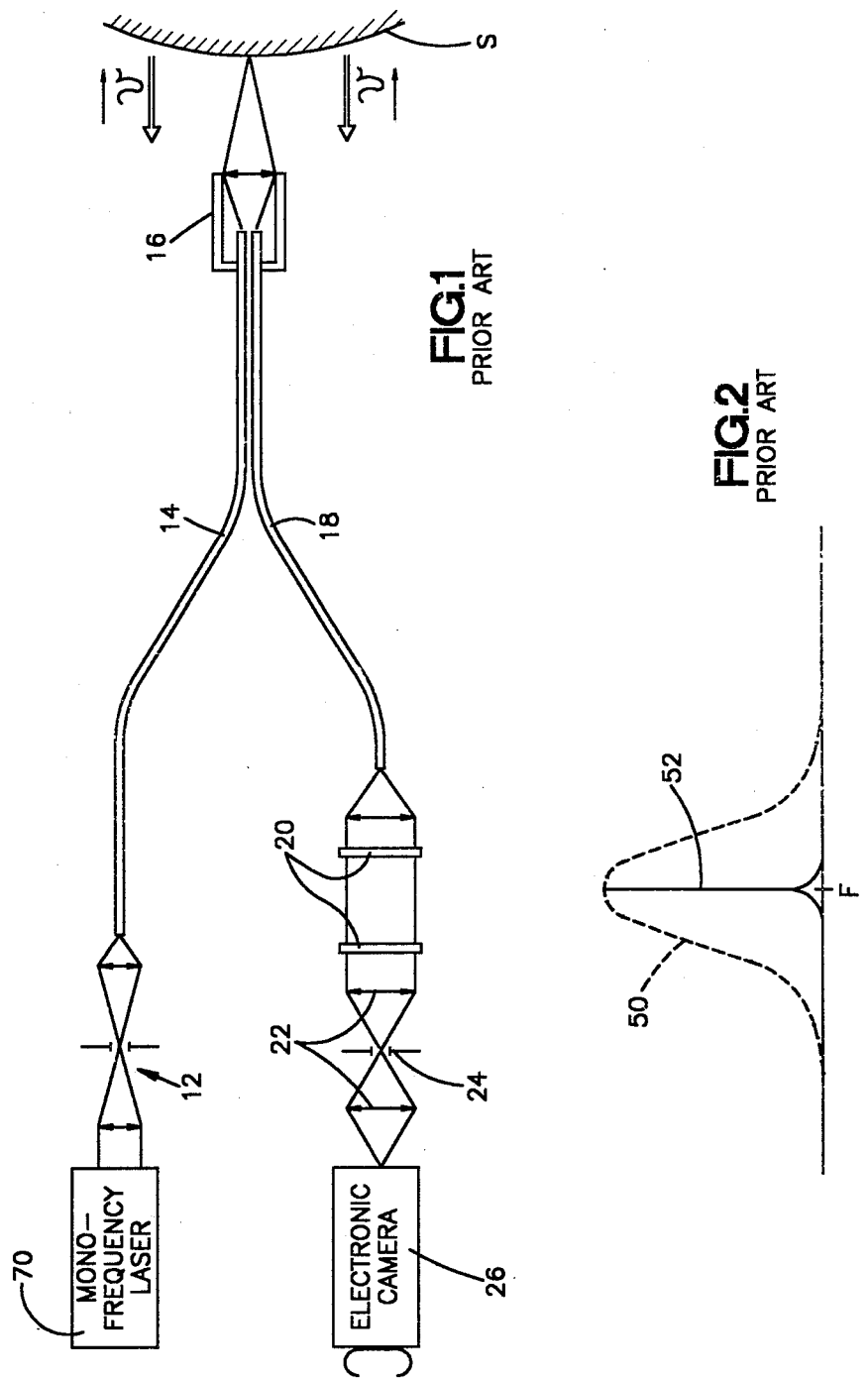

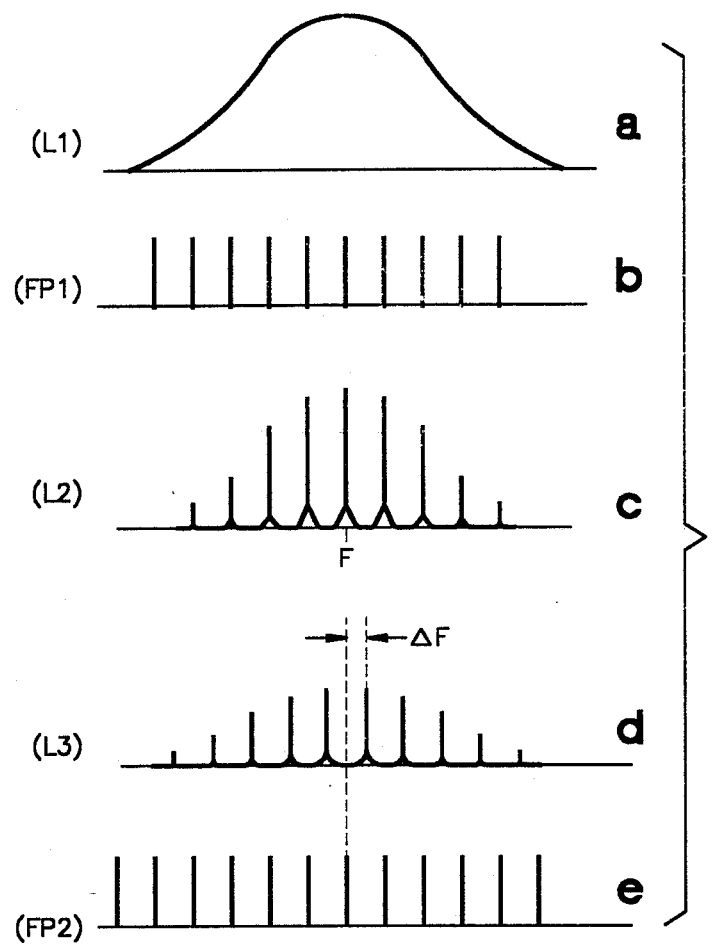
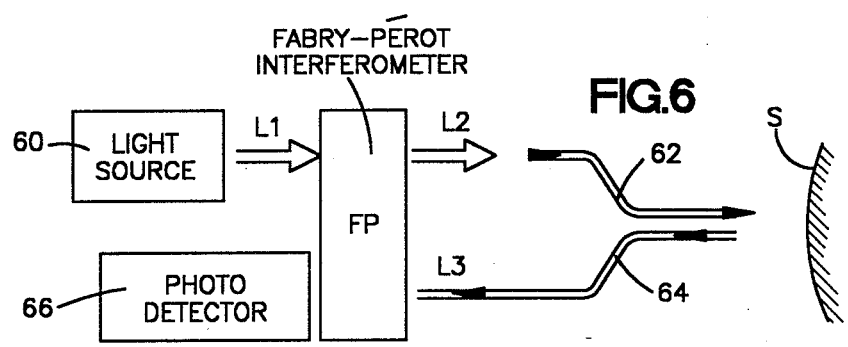

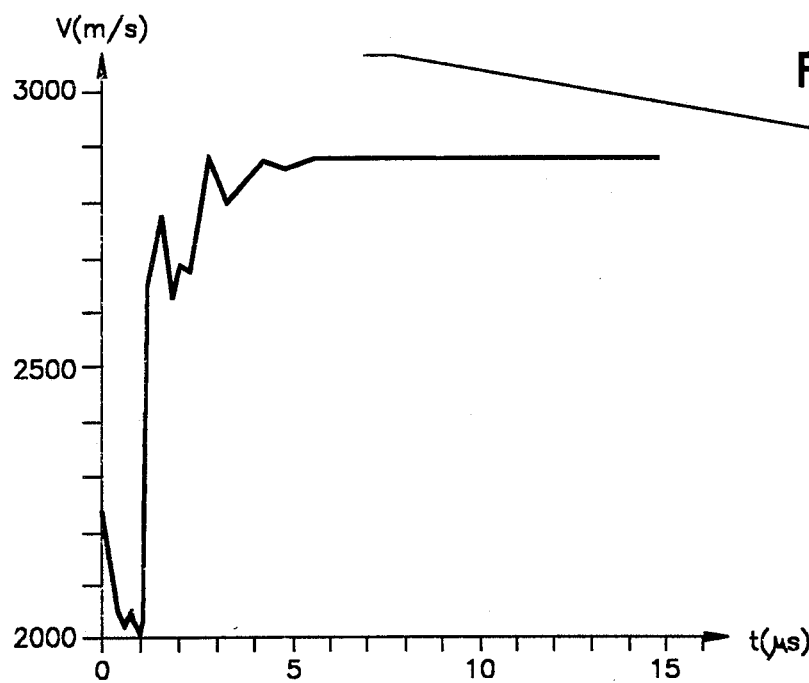
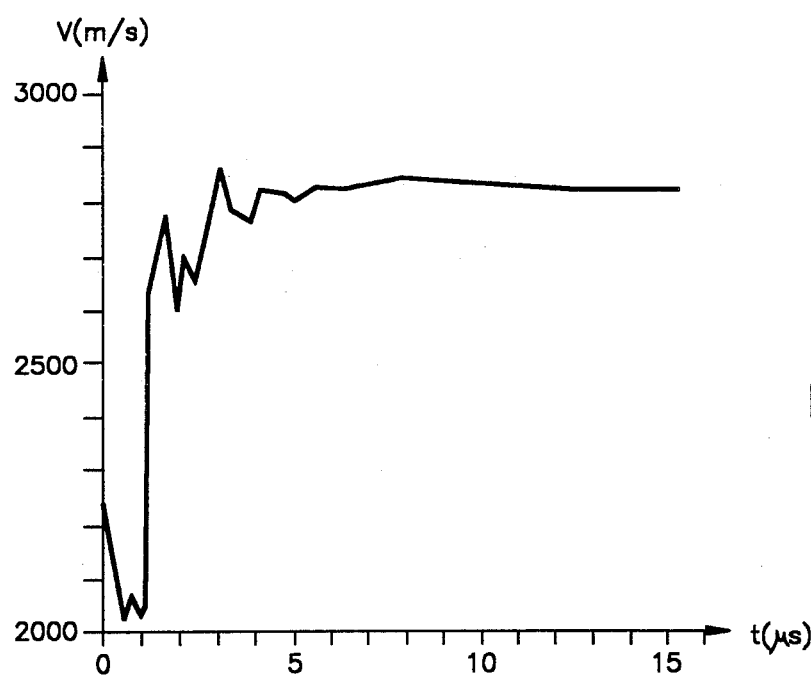
FIG.8

OPTICAL DEVICE USING A MATCHED INTERFEROMETRIC ANALYZER AND FILTER

DESCRIPTION

The present invention relates to an optical device using a matched interferometric analyzer and filter. It is used in the measurement of the position, displacement or speed of a surface or object. One of the fields of application of the invention is the study of the hydrodynamic behaviour of materials under shock effect (detonics).

The device according to the invention is of the DOPPLER velometer or speedometer type. Such a device is known and the principle thereof is briefly described relative to FIGS. 1 to 3.

FIG. 1 shows a monomode or monofrequency laser 10, e.g. of the argon type, emitting a light beam traversing an ultra-fast shutter 12 and penetrating an optical fibre 14. At the other end of the fibre is provided a head 16 positioned close to a surface S, whose speed is to be measured. Head 16 maintains another fibre 18, which receives the light reflected or diffused by surface S and guides it towards a Fabry-Pérot interferometer 20. To the rear of the latter is provided an optics 22, a slit 24 and an electronic camera 26, e.g. of the slit scanning type.

FIGS. 2 and 3 enable the operation of the installation to be described. Laser 10 emits monochromatic light characterized by a single frequency F (whose value is dependent on the mode selection system used). On diagrammatically representing, as in FIG. 2, the line 50 used in the stimulated emission mechanism (e.g. the line at 5145 Å for the ionized argon laser), the single oscillating mode in the laser is like 52, whose width is very small (the drawing is not to scale). The elimination of all the other modes is generally obtained through the use of an air wedge introduced into the laser cavity.

This single frequency of the incident radiation is displaced by the DOPPLER effect during the reflection of the light beam on surface S. The frequency shift $\Delta F$ is linked with the speed V by relation:

$$V = \frac{c}{2} \frac{\Delta F}{F}$$

in which c is the speed of light with respect to the surface.

When the return beam at frequency $F + \Delta F$ traverses the Fabry-Pérot interferometer 20, there is a multiple interference phenomenon giving rise, to the rear, to a series of rings appearing on part a of FIG. 3 under reference 30. On observing these rings through a slit 32, circular segments 34 are obtained, whose spacing is dependent on the value of $\Delta F$.

In part b of FIG. 3, it is possible to see the line corresponding to these segments and evolving as a function of time, said line being assumed to run from bottom to top. In part 40, the target is still stationary and the lines are rectilinear because the rings retain their diameter. At instant 42, the target is suddenly put into movement and its speed increases. Following a sudden displacement the lines represent curves reflecting the target speed value. More specifically, the speed V is given by the formula:

$$V = \frac{\lambda c}{4e} \, n + \left[ \frac{D'_1{}^2 - D_1{}^2}{D_2{}^2 - D_1{}^2} \right]$$

in which $\lambda$ is the wavelength corresponding to the single frequency of the laser, c is the speed of light, e the length of the Fabry-Pérot interferometer, D1 and D2 the diameters of the first and second rings and n the number of ring jumps.

Such a device is e.g. described in the article by S. GIDON, G. GARCIN and G. BEHAR entitled "Doppler laser interferometry with light transmission by two optical fibers" and in the article by M. DURAND entitled "Emploi de fibres optiques pour la mesure de vitesse par interferometrie Doppler-Laser avec interferometre de Fabry-Pérot" both published in the reports of the 16th conference of "High Speed Photography and Photonics", held on 27–31 Aug. 1984 at Strasbourg, France, SPIE, vol. 491, pp 894–898 for the former and pp 650 to 657 for the latter.

Although satisfactory in certain respects, these devices still suffer from disadvantages. Thus, the purity of the frequency spectrum required for the light source means that the available lighting power is low. Thus, it is known that the operation consisting of making the laser monofrequency leads to significant power losses, not only because it selects one among several modes, but also because the selected mode is attenuated by the optical selection devices. Thus, in the case of ionized argon lasers, working takes place with power levels of a few watts. If it is wished to increase this power use must be made of amplifying means, e.g. of the dye laser type. However, such installations are very complex. In addition, with such means it is scarcely possible to exceed about 10 watts.

The aim of the present invention is to obviate this disadvantage. It therefore recommends a means making it possible in a very simple manner to obtain a high working lighting power beam of e.g. at least 100 watts, which is approximately 20 times the power levels generally used in the prior art.

The invention also runs counter to the prejudices of the prior art in that it recommends abandoning the principle of using monofrequency radiation. In fact it provides for the formation of multifrequency radiation with the aid of a broad spectrum lighting source (either a coherent source: gas, dye, solid, semiconductor or similar lasers; or an incoherent source: light emitting diode, lamp, arc, etc.), said source being externally associated with a frequency filter, whose spectral characteristic is formed by a range of equidistant frequencies. The use beam then becomes multifrequency and consequently high power. Combined with the first arrangement, the invention also provides a second consisting of using an interferometric analysis system having the same frequency spectrum as the filter used on emission.

By analogy with a method used in electrical transmission, it can be said that the invention performs a matched filtering.

The interference mechanism occurring in the reception channel and which makes it possible to measure the displacement and/or speed of the surface takes place for all the frequencies present. Each ring resulting from a constructive interference, which was unique in the prior art due to the uniqueness of the frequency, becomes multiple as a result of the multiplicity of frequencies recommended by the invention. However, surprisingly, this multiplicity in no way reduces the accuracy of the measurement. The interference pattern formed behind the interferometric analysis device is clearly defined and makes it possible to measure the speed increasingly easily as the intensity of the rings is reinforced through the greater lighting power.

The considerable scope offered by the invention in the choice of the lighting source makes it possible to use very high power, pulse-operating lasers. Naturally, in this case, the light pulse must be synchronized with the phenomenon to be studied, particularly in detonic measurements.

The invention will be better understood as a result of the following description relative to the attached drawings, wherein show:

FIG. 1, already described, a prior art velometer.

FIG. 2, already described, diagrammatically a monofrequency spectrum.

FIG. 3, already described, the diffraction rings obtained behind the analysis device.

Figure 4:
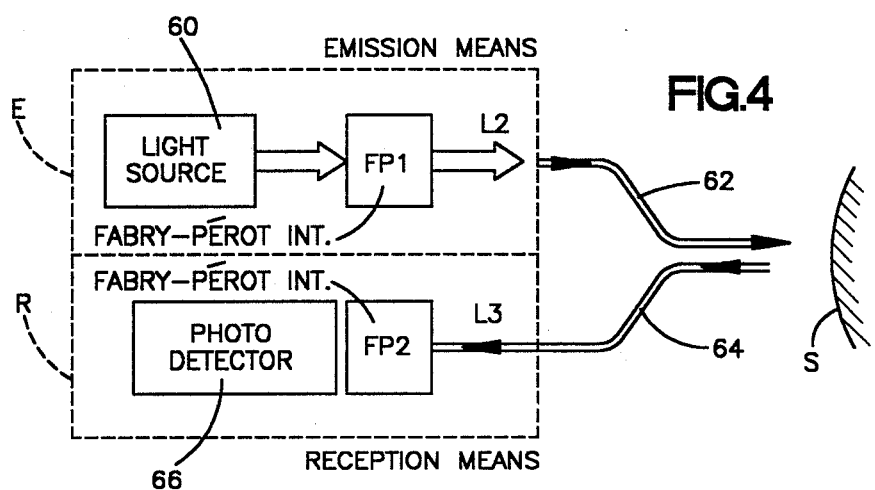

FIG. 4 the device according to the invention.

FIG. 5 spectral characteristics of the device according to the invention.

FIG. 6 an advantageous variant of the invention.

Figure 7:
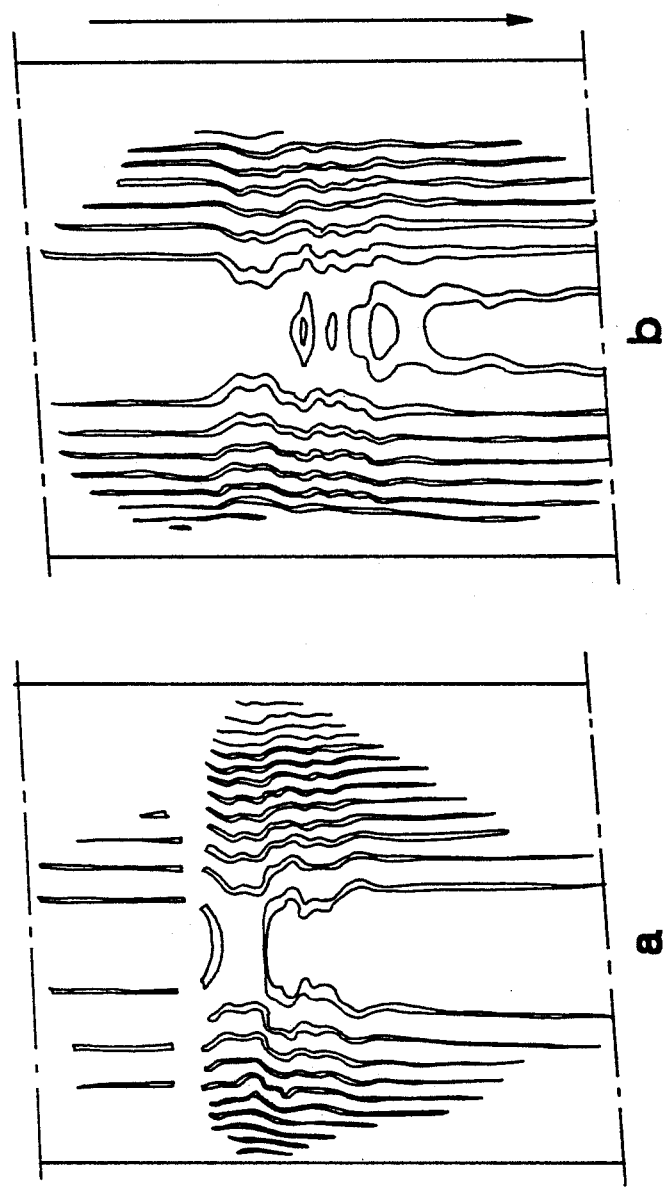

FIG. 7 two examples of lines obtained respectively with an argon laser and a dye laser.

FIG. 8 two curves giving the result of a calculation, following analysis, of the variation of the speed of a surface with these two laser types.

The device according to FIG. 4 comprises an emission means E and a reception means R. The emission means comprises a lighting source 60 emitting a light beam L1 made directional by not shown means (set of lenses), a first interferometer FP1, e.g. of the Fabry-Pérot type, said interferometer supplying a beam L2. This beam is guided by a fibre 62 to a surface S to be studied. The beam L3 reflected or diffused by S is guided by a fibre 64 to the reception means, which comprises a second interferometer FP2 behind which is located a photodetector 66, e.g. a focal-plane shutter camera.

In order to understand the operation of such a device, it is necessary to describe the various spectral characteristics of the means forming the same. FIG. 5 shows in part (a) the spectrum of the beam L1 emitted by source 60. This spectrum is wide. It corresponds to the emission band or line of the material used in the source. If it is a dye laser, said band is the fluorescence band of the dyeing substance (e.g. Rhodamine 6G). In the case of an argon laser, the line is one of those of the argon atom which has been ionized several times.

Part (b) shows the frequency range of the first Fabry-Pérot interferometer FP1.

Part (c) shows the spectrum of the light beam L2 from interferometer FP1. The broad band is filtered into a certain number of equidistant frequencies. Such a spectrum will not be confused with the spectrum of a multimode laser, although they have identical shapes or courses. Thus, in the case of the invention, the spectrum obtained is imposed by a Fabry-Pérot interferometer outside the laser. Therefore such a spectrum has a very great stability. On using the radiation emanating from a multimode laser, the stability of these modes would be highly inadequate and would not make it possible to obtain a stable interference pattern.

Part (d) shows the spectrum of the return beam. Firstly the amplitude of the radiation has been attenuated by the reflection or diffusion, but in particular the frequencies are displaced by a quantity $\Delta F$, which is a function of the displacement speed of surface S.

The beam with this spectrum traverses the second Fabry-Pérot interferometer FP2, whose frequency range is identical to that of the first interferometer FP1. To the rear of this second interferometer are formed diffraction rings, whose diameter is analysed as in the prior art.

The simplest means for obtaining the identity of the spectrum of the two interferometers is to use one and the same device, as illustrated in FIG. 6. It is possible to see therein a Fabry-Pérot interferometer FP, whose upper part is used for the beam to be filtered and whose lower part is used for the beam to be analysed.

FIG. 7 shows the curves obtained with an argon laser (part a) and with a dye laser (part b). These curves have the conventional forms described relative to FIG. 2. The upper part of the curves of FIG. 7 corresponds to a static period, which corresponds to the immobility of the target. The lower part corresponds to the movement of the target.

The results of part (b) were obtained with an electronic flash-pumped Rhodamine 6G dye laser. The duration of the light pulse was 50 $\mu$s and the power 10 kW peak. After filtering a power of 100 W was available.

The argon laser was of the conventional type having continuous operation, a mode selector and a power of 5 W.

FIG. 8 shows the result of the analysis of the measurements. On the abscissa is plotted the time and on the ordinate the speed of the target. In part (a), which corresponds to an argon laser, the initial measured speed was 2230 m/s and the final speed 2860 m/s. In part (b), which corresponds to the use of a dye laser, the initial measured speed was 2250 m/s and the final speed 2810 m/s.

The estimated precision of the measurements is $\pm$ 20 m/s for an apparatus speed of approximately 1000 m/s ("the apparatus speed" corresponding to the term $c\lambda/4e$ appearing in the formula given hereinbefore, i.e. it is the speed for which the interference order changes by one unit, or in other words for which there has been the passage of one fringe).

We claim:

1. An optical device for measuring the position, displacement and/or speed of a surface, comprising:
a light source emitting a directional light beam with a wide spectrum,
first interferometric means having a multifrequency filtering spectrum and positioned so that said light beam emitted by said light source must pass through said first frequency filtering interferometric means, a light beam having a multifrequency spectrum within said wide spectrum being so emitted from said first frequency filtering interferometric means,
means for directing said light beam having a multifrequency spectrum onto a surface to be measured,
means for collecting the multifrequency light coming from said surface to be measured,
second interferometric means having said multifrequency filtering spectrum and positioned so that said collected light must pass therethrough, diffraction rings being so formed to the rear of said interferometric means, and means for measuring the diameter of said diffraction rings and for computing said position, displacement and/or speed from said diameter.

2. Device according to claim 1, wherein at least one of said first and second interferometric means is a Fabry-Pérot interferometer.

3. Device according to claim 1, characterized in that said first and second interferometric means are constituted by a single Fabry-Pérot interferometer used on the one hand with the beam emitted by the source and on the other with the beam from the studied surface.

4. Device according to claim 1, characterized in that the photodetector is a focal-plane shutter camera.

5. Device according to claim 1, characterized that the lighting source is a coherent source, e.g. a dye, gas, solid or semiconductor laser.

6. Device according to claim 1, characterized in that the lighting source is an incoherent source, e.g. a light emitting diode, a lamp or an arc.

7. Device according to claim 1, characterized in that the lighting source operates in pulsed manner.

* * * * *